United States Patent
Takemori et al.

(10) Patent No.: US 7,019,484 B2
(45) Date of Patent: Mar. 28, 2006

(54) STEPPING MOTOR DRIVER

(75) Inventors: Akio Takemori, Kiryu (JP); Yoshifumi Kuwano, Kiryu (JP); Hiroaki Taka, Kiryu (JP)

(73) Assignee: Japan Servo Co., Ltd., Tokyo (JP)

( * ) Notice: Subject to any disclaimer, the term of this patent is extended or adjusted under 35 U.S.C. 154(b) by 0 days.

(21) Appl. No.: 11/091,503

(22) Filed: Mar. 29, 2005

(65) Prior Publication Data

US 2005/0218858 A1    Oct. 6, 2005

(30) Foreign Application Priority Data

Mar. 30, 2004    (JP)    ............................. 2004-097714
Mar. 30, 2004    (JP)    ............................. 2004-097715

(51) Int. Cl.
     *G05B 19/40*      (2006.01)

(52) U.S. Cl. ...................... 318/685; 318/696; 318/700; 318/701; 318/714; 318/720; 318/721; 318/722

(58) Field of Classification Search ................. 318/685, 318/696, 700, 701, 714, 720, 721, 722, 723, 318/724, 138, 254, 439
See application file for complete search history.

(56) References Cited

U.S. PATENT DOCUMENTS 6,850,026 B1 *    2/2005    Takemori et al. ........... 318/685
6,850,027 B1 *    2/2005    Kuwano et al. ............. 318/685
2004/0178763 A1 *    9/2004    Kuwano et al. ............. 318/685

FOREIGN PATENT DOCUMENTS

JP      08-098595      4/1996

OTHER PUBLICATIONS

Ooki, Hagime, "Theory and Practice of Step Motor", JIK-KYO SHUPPAN Co., LTD., pp. 152-158.
Kenzyou and Sugawara, "Microcomputer Control of Stepping Motor", SOUGOU-DENSHI SHUPPAN CO., LTD., pp. 231-233.

* cited by examiner

*Primary Examiner*—Karen Masih
(74) *Attorney, Agent, or Firm*—Birch, Stewart, Kolasch & Birch, LLP

(57) ABSTRACT

A stepping motor driver according to the present invention includes a torque component current calculating means for calculating a torque component current from phase currents and a rotor rotation angle, an absolute value converting means for obtaining an absolute value of the torque component current, a high speed-response judging means adapted for outputting a first control signal when a speed deviation between a command speed and a rotor speed is not more than a reference level, and outputting a second control signal when the speed deviation exceeds the reference level, and a current command outputting means adapted for outputting a current command according to the absolute value of the torque component current when the first control signal is outputted, and outputting a maximum current command value as the current command when the second control signal is outputted.

8 Claims, 5 Drawing Sheets

STEPPING MOTOR DRIVER

BACKGROUND OF THE INVENTION

1. Field of the Invention

The present invention relates to a stepping motor driver which drives a stepping motor for control of the position and speed of driven equipment.

2. Description of the Prior Art

In most conventional stepping motors, a current command is fixed.

Therefore, there is a problem that a stepping motor consumes much power and is less efficient because a fixed current flows even while it is stopped or running at a low speed.

As a solution to this problem, the following approach to reduce power consumption has been taken: during motor running, a command for a current which is enough to generate a required torque is selected and upon elapse of a given time after a motor stop, the value of the current command is decreased to the necessary minimum.

However, even in this case, since the exciting current of the stepping motor is controlled with a fixed current command during motor running, its power consumption is considerable and its efficiency is low. Also, in the event that a high speed-response is required, it is impossible to power up the torque output of the stepping motor.

SUMMARY OF THE INVENTION

An object of the present invention is to provide a stepping motor drive which ensures that the power consumption of a stepping motor is low and that the torque output of the stepping motor is power up in the event that a high speed-response is required.

In accordance with the present invention, there is provided a stepping motor driver which comprises an excitation angle generating means for generating an excitation angle from an external command pulse, a current control means for controlling exciting currents of a stepping motor according to the excitation angle and a current command, a current detection means for detecting phase currents of the stepping motor, an angle detection means for detecting a rotor rotation angle of the stepping motor, a torque component current calculating means for calculating a torque component current from the phase currents and the rotor rotation angle, an absolute value converting means for obtaining an absolute value of the torque component current, a high speed-response judging means adapted for outputting a first control signal when a speed deviation between a command speed and a rotor speed is not more than a reference level, and outputting a second control signal when the speed deviation exceeds the reference level, and a current command outputting means adapted for outputting the current command according to the absolute value of the torque component current when the first control signal is outputted from the high speed-response judging means, and outputting a maximum current command value as the current command when the second control signal is outputted from the high speed-response judging means.

In this stepping motor driver, it is possible to automatically adjust the current command depending upon the load of the stepping motor and thus power consumption of the stepping motor can be reduced and heat generation of the stepping motor can be suppressed. In addition, in the event that the high speed-response is required, it is possible to power up a torque output of the stepping motor by boosting the current command.

BRIEF DESCRIPTION OF THE DRAWINGS

These and other objects and many of the attendant advantages of the present invention will be readily appreciated as the same becomes better understood by reference to the following detailed description when considered in connection with the accompanying drawings, wherein.

DETAILED DESCRIPTION OF THE INVENTION

Figure 1:
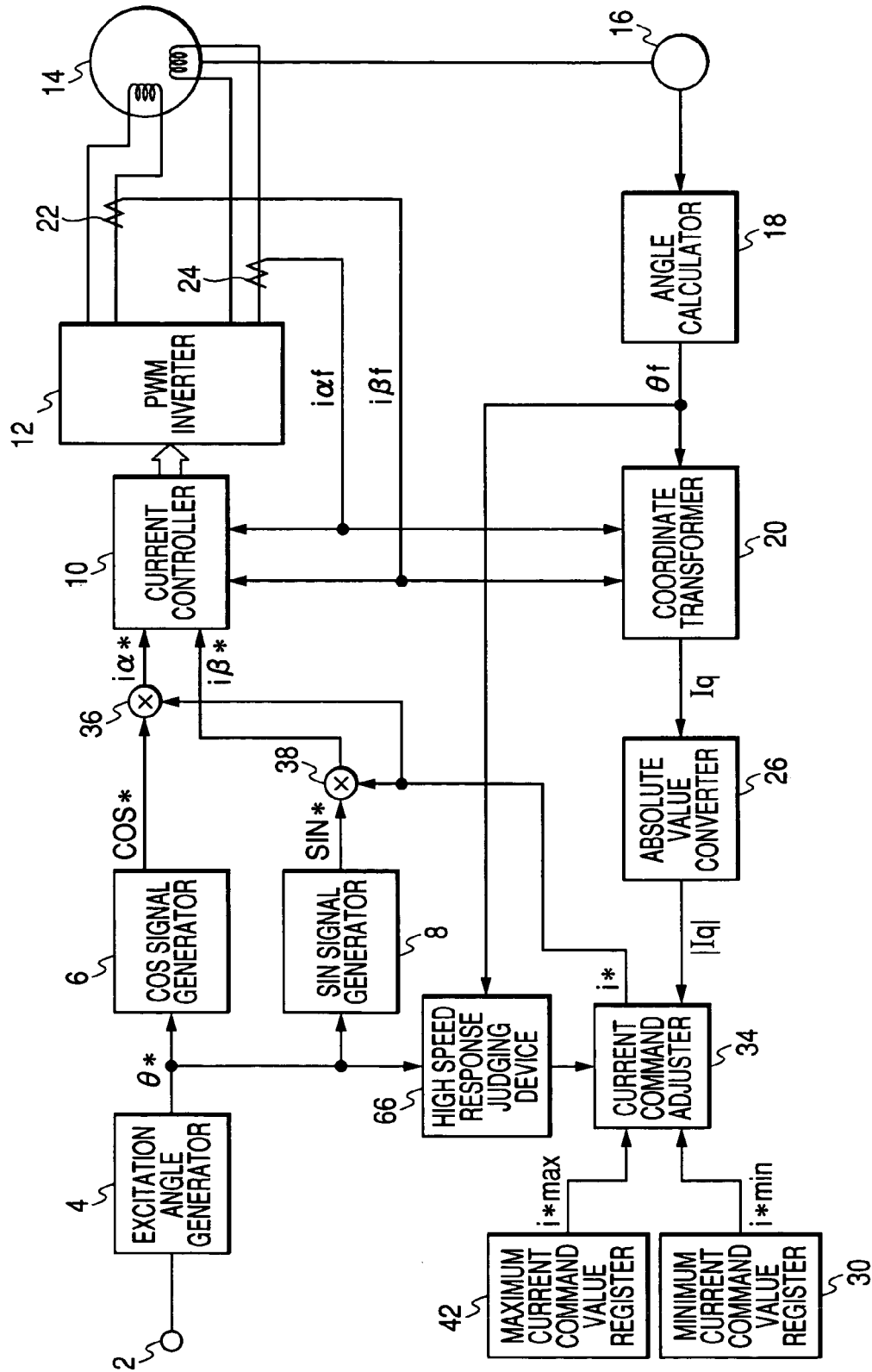
FIG. 1 is a block diagram showing a stepping motor driver according to a first embodiment of the present invention.
Figure 2:
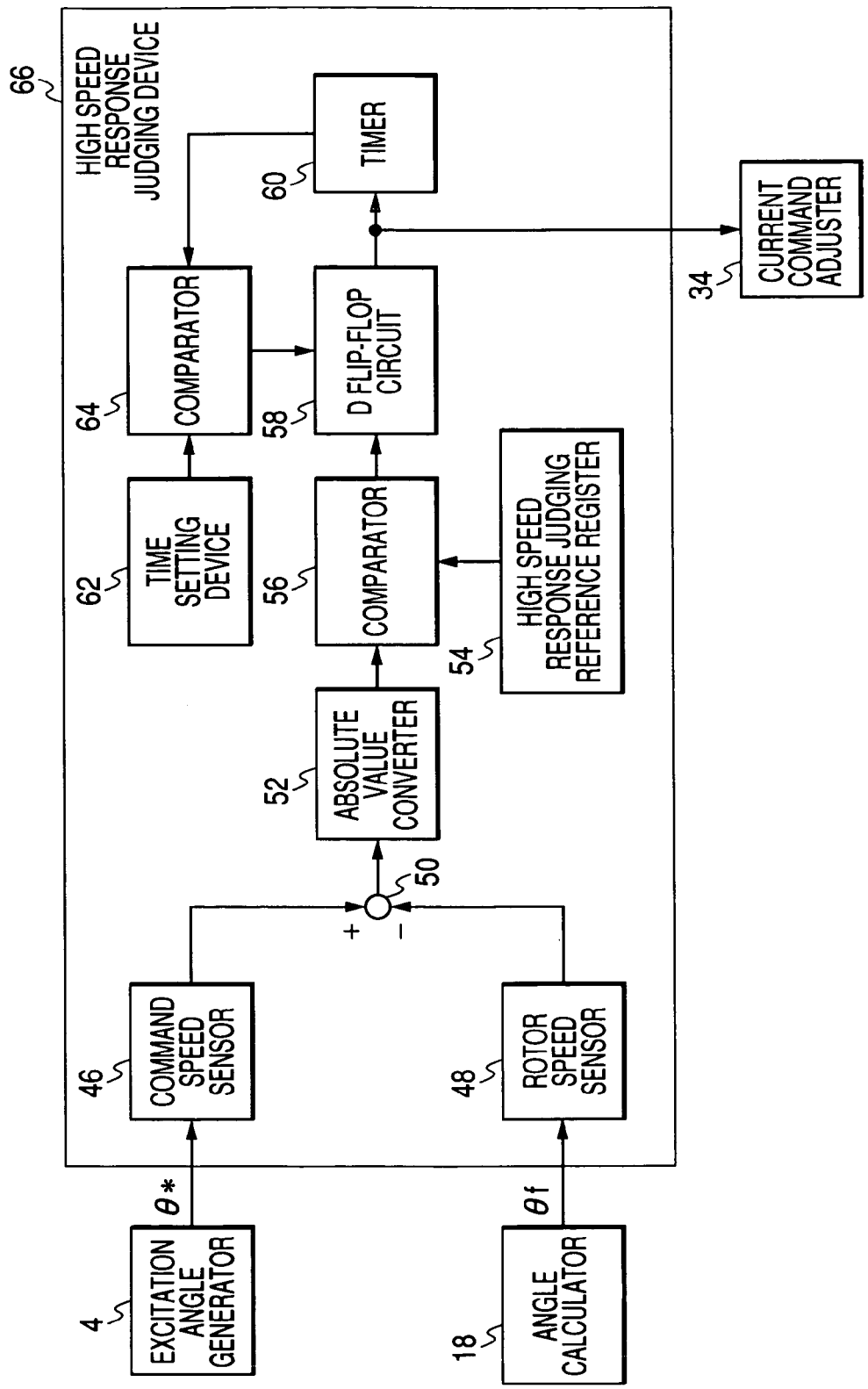
FIGS. 2 and 3 are each a block diagram showing a part of the stepping motor driver of FIG. 1.
Figure 3:
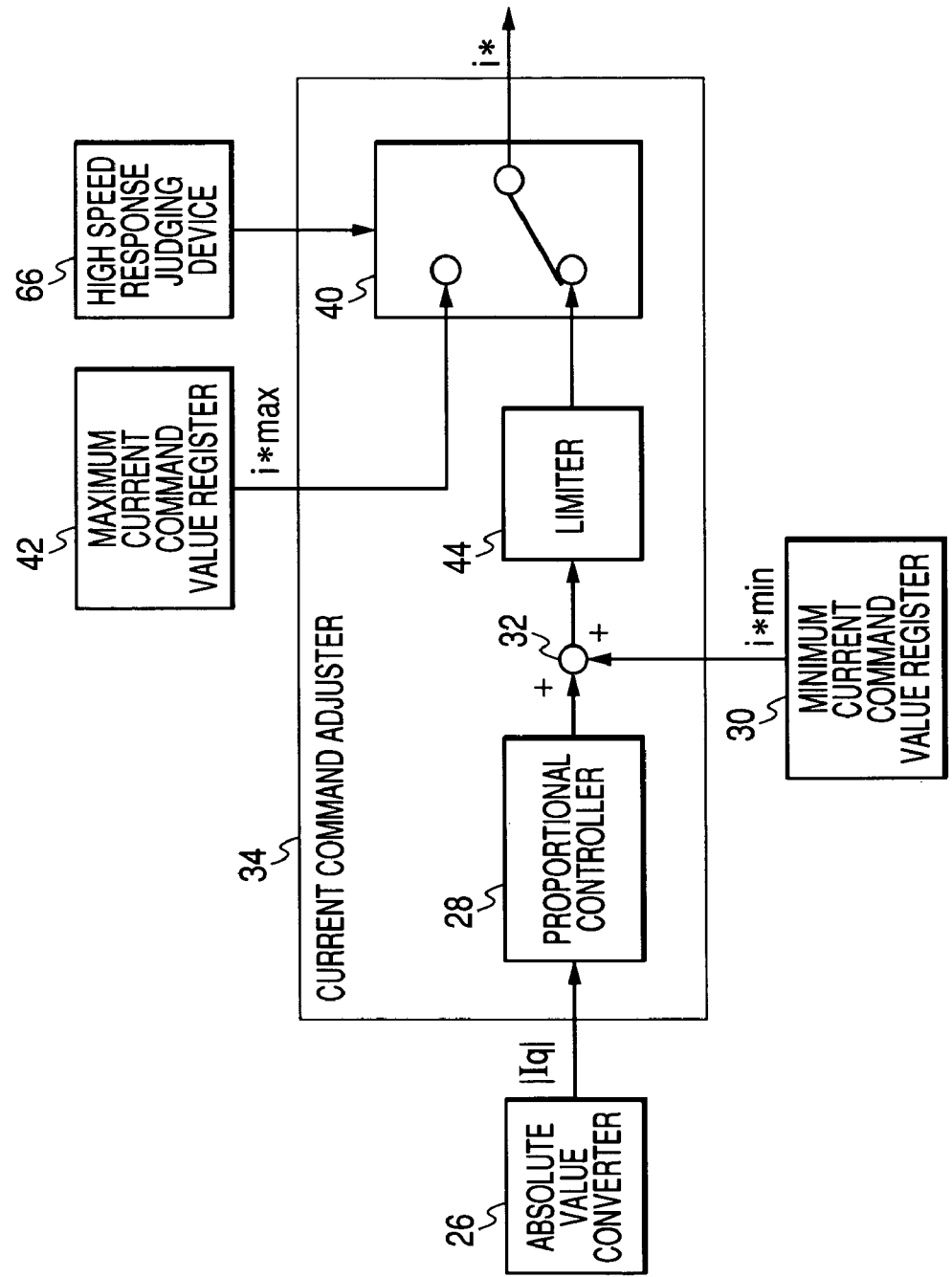

Referring to FIGS. 1 to 3, a stepping motor driver according to a first embodiment of the present invention will be discussed hereinafter.

An excitation angle generator 4 generates an excitation angle $\theta^*$ from an external command pulse added to an external command pulse input terminal 2. A COS signal generator 6 and a SIN signal generator 8 respectively generate COS signal COS* and SIN signal SIN* using the excitation angle $\theta^*$. Multipliers 36 and 38 multiply a current command i* (explained later) by COS signal COS* and SIN signal SIN* and generate alpha-phase current command $i\alpha^*$ (i*cos $\theta^*$) and beta-phase current command $i\beta^*$ (i*sin $\theta^*$), respectively. A current controller 10 receives phase currents $i\alpha f$ and $i\beta f$ (explained later) and controls an exciting current (motor winding current) so as to cause it to agree with the alpha-phase current command $i\alpha^*$ and beta-phase current command $i\beta^*$, respectively. A PWM inverter 12 applies a given voltage to a stepping motor 14 according to output of the current controller 10. That is, the stepping motor 14 is energized in such a manner that an exciting current varying in a sinusoidal manner upon each application of an external command pulse is supplied to the stepping motor 14. The stepping motor 14 has a microstepping function in which a basic step angle is divided into subdivisions, and step-rotates each time the external command pulse is applied.

Also, an angle sensor 16 such as an encoder, a resolver or the like is attached to the stepping motor 14. An angle calculator 18 outputs a detected angle $\theta f$ (rotor rotation angle of the stepping motor 14) according to a signal form the angle sensor 16. Current sensors 22 and 24 detect phase currents $i\alpha f$ and $i\beta f$ of the stepping motor 14, respectively. A coordinate transformer 20 calculates a torque component current Iq from the detected angle $\theta f$ and the phase currents $i\alpha f$, $i\beta f$. The torque component current Iq is expressed by the following equation, in accordance with the relation shown in the motor vector diagram of FIG. 2.

$$Iq = -i\alpha f \sin \theta f + i\beta f \cos \theta f.$$

An absolute value converter 26 obtains an absolute value of the torque component current Iq. A minimum current command value register 30 outputs a minimum current command value i*min (current command initial value). Here, the minimum current command value i*min should be a minimum value required to obtain a starting torque at the start of the motor (at power input). A maximum current command value register 42 outputs a maximum current command value i*max. Here, the maximum current command value i*max should be a maximum value of the current which can be supplied to the stepping motor 14, and a register maximum value which is suitable to protect the motor from problems occurring due to an increase in the current command value, such as overcurrent, inverter damage and motor overheat.

A command speed sensor 46 differentiates the excitation angle θ*, to thereby detect a command speed. A rotor speed sensor 48 differentiates the detected angle θf, to thereby detect a rotor speed. An adder 50 obtains a difference between the command speed and the rotor speed. An absolute value converter 52 obtains an absolute value of the above difference, i.e., a speed deviation. A high speed-response judging reference register 54 outputs a predetermined reference value. A comparator 56 compares the speed deviation with the reference value and, when the speed deviation is not less than the reference value, outputs a high speed-response judging signal of 1 clock. A D flip-flop circuit 58 normally outputs a first control signal and, upon receiving of the high speed-response judging signal, outputs a second control signal. A timer 60 calculates time from the output of the second control signal. A time setting device 62 outputs a set time previously set. A comparator 64 outputs a set time lapse signal when time calculated by the timer 60 is equal to the set time. When the set time lapse signal is outputted from the comparator 64, the D flip-flop circuit 58 again outputs the first control signal. A high speed-response judging device 66 is made up of the comparator 56, the D flip-flop circuit 58 and the like. The first and second control signals are outputted from the high speed-response judging device 66.

A proportional controller 28 multiplies the absolute value of the torque component current Iq by a coefficient to obtain a load torque equivalent-current command value. The above coefficient should be 1 or more. An adder 32 adds the minimum current command value i*min to the load torque equivalent-current command value. If the sum of the minimum current command value i*min and the load torque equivalent-current command value is less than the predetermined maximum current command value i*max, a limiter 44 outputs the above sum and, if the sum exceeds the predetermined maximum current command value i*max, the limiter 44 outputs the maximum current command value i*max. When the first control signal is outputted from the high speed-response judging device 66, a changeover switch 40 outputs the power of the limiter 44 and, when the second control signal is outputted from the high speed-response judging device 66, the changeover switch 40 outputs the power of the maximum current command value register 42. A current command adjuster 34 is made up of the limiter 44, the changeover switch 40 and the like. The power of the changeover switch 40 is outputted from the current command adjuster 34. The power of the current command adjuster 34 is used as the current command i*.

The excitation angle generator 4 constitutes an excitation angle generating means for generating an excitation angle from an external command pulse. The COS signal generator 6, the SIN signal generator 8, the multipliers 36, 38 and the current controller 10 constitute a current control means for controlling exciting currents according to the excitation angle and a current command. The current sensors 22, 24 constitute a current detection means for detecting phase currents of a stepping motor. The angle sensor 16 and the angle calculator 18 constitute an angle detection means for detecting a rotor rotation angle of the stepping motor. The coordinate transformer 20 constitutes a torque component current calculating means for calculating a torque component current from the phase currents and the rotor rotation angle. The absolute value convertor 26 constitutes the absolute value converting means for obtaining an absolute value of the torque component current. The high speed-response judging device 66 constitutes a high-speed-response judging means adapted for outputting a first control signal when a speed deviation between a command speed and a rotor speed is not more than the reference value, and outputting a second control signal when the speed deviation exceeds the reference value. The maximum current command value register 42, the minimum current command value register 30 and the current command adjuster 34 constitute a current command outputting means adapted for outputting the current command according to the absolute value of the torque component current when the first control signal is outputted from the high speed-response judging means, and outputting a maximum current command value as the current command when the second control signal is outputted from the high speed-response judging means. The proportional controller 28 constitutes a proportional controlling means adapted for outputting a load torque equivalent-current command value proportional to the absolute value of the torque component current. The adder 32 constitutes an adder means adapted for adding the load torque equivalent-current command value to the minimum current command value. The limiter 44 constitutes a limitation means adapted for outputting a maximum current command value when the sum of the minimum current command value and the load torque equivalent-current command value exceeds the maximum current command value. The D flip-flop circuit 58, the timer 60, the time setting device 62 and the comparator 64 constitute a time limitation means adapted to output the first control signal when a set time passes from the time when the second control signal is outputted. The command speed sensor 46 constitutes a command speed detecting means adapted for detecting the command speed from a change in the excitation angle. The rotor speed sensor 48 constitutes a rotor speed detecting means adapted for detecting the rotor speed from a change in the rotor rotation angle.

In this stepping motor driver, when a command pulse is given to the external command pulse input terminal 2, the operation sequence is as follows: the excitation angle generator 4 generates an excitation angle θ* from the external command pulse, the COS signal generator 6 and the SIN signal generator 8 generate COS signal COS* and SIN signal SIN*, respectively, from the excitation angle θ*,the multipliers 36 and 38 generate alpha-phase current command iα* and beta-phase current command iβ* from the COS signal COS*, the SIN signal SIN* and the current command i*, the current controller 10 controls the exciting current for the stepping motor 14 in such a manner to cause it to agree with the alpha-phase current command iα* and the beta-phase current command iβ*, and the PWM inverter 12 applies a given voltage to the stepping motor 14 according to the output of the current controller 10. Thus, the rotor of the stepping motor 14 rotates.

Also, the angle calculator 18 outputs a detected angle θf, the current sensors 22 and 24 output phase currents iαf and iβf, the coordinate transformer 20 calculates torque component current Iq from the detected angle θf and the phase currents iαf, iβf, and the absolute value converter 26 obtains the absolute value of the torque component current Iq.

Also, the command speed sensor 46 detects a command speed, the rotor speed sensor 48 detects a rotor speed, the adder 50 obtains a difference between the command speed and the rotor speed, and the absolute value converter 52 obtains a speed deviation. When the speed deviation is not more than the reference level, the comparator 56 does not output a high speed-response judging signal, so that the D flip-flop circuit 58 outputs a first control signal. When the speed deviation exceeds the reference level, the comparator 56 outputs the high speed-response judging signal, so that the D flip-flop circuit 58 outputs a second control signal. The timer 60 times from when the speed deviation exceeds the reference level. When time calculated by the timer 60 reaches the set time set by the time setting device 62, the comparator 64 outputs a set time lapse signal, so that the D flip-flop circuit 58 again outputs the first control signal. Therefore, when the speed deviation is not more than the reference level, the high speed-response judging device 66 outputs the first control signal. On the other hand, when the speed deviation exceeds the reference level, the high speed-response judging device 66 outputs the second control signal. When the set time passes from when the speed deviation exceeds the reference level, the high speed-response judging device 66 again outputs the first control signal.

The proportional controller 28 obtains a load torque equivalent-current command value from the absolute value of the torque component current Iq. The adder 32 adds the minimum current command value i*min to the load torque equivalent-current command value. When the first control signal is outputted from the high speed-response judging device 66, if the sum of the minimum current command value i*min and the load torque equivalent-current command value is not more than the maximum current command value, the changeover switch 40 outputs a sum value of the minimum current command value i*min and load torque-equivalent current command value. If the sum of the minimum current command value i*min and the load torque equivalent-current command value exceeds the maximum current command value i*max, the changeover switch 40 outputs the maximum current command value i*max. When the second control signal is outputted from the high speed-response judging device 66, the changeover switch 40 outputs the maximum current command value i*max. Therefore, when the speed deviation is not more than the reference level, the current command adjuster 34 outputs the sum value of the minimum current command value i*min and the load torque equivalent-current command value as the current command i*. However, when the sum value of the minimum current command value i*min and the load torque equivalent-current command value exceeds the maximum current command value i*max, the current command adjuster 34 outputs the maximum current command value i*max as the current command i*. Also, when the speed deviation exceeds the reference level, the current command adjuster 34 outputs the maximum current command value i*max as the current command i* while the set time passes from when the speed deviation exceeds the reference level.

Figure 4:
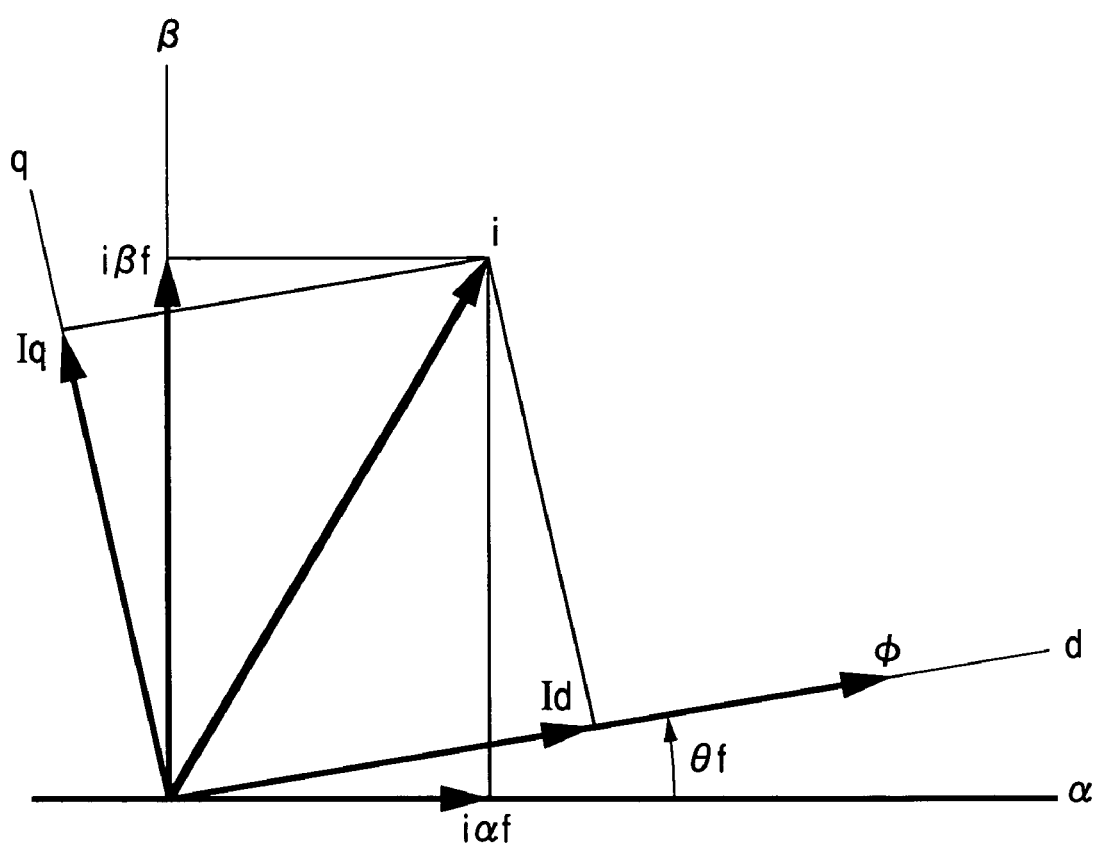
FIG. 4 is a motor vector diagram.

In this stepping motor driver, when the absolute value of the torque component current Iq increases, the load torque equivalent-current command value increases and thus the current command i* increases. Hence, the exciting current in the stepping motor 14 becomes larger. On the other hand, when the absolute value of the torque component current Iq decreases, the load torque equivalent-current command value decreases and thus the current command i* decreases. Hence, the exciting current in the stepping motor 14 becomes smaller. When the stepping motor 14 is stopped and the load torque is zero, the current vector i coincides with an axis d as shown in FIG. 4 and the torque component current Iq is therefore zero. On the other hand, when the stepping motor 14 outputs a maximum torque, the current vector i coincides with an axis q as shown in FIG. 4 and the torque component current Iq is therefore the maximum. While the motor is running, the same is true and the torque component current Iq depends upon the load torque. Therefore, in a case where a change in the command speed is minor and the speed deviation is not more than the reference level, when the absolute value of the load torque increases, the load torque equivalent-current command value increases, so that the exciting current in the stepping motor 14 becomes larger. On the other hand, when the absolute value of the load torque decreases, the load torque equivalent-current command value decreases, so that the exciting current in the stepping motor 14 becomes smaller. Thus, power consumption is reduced, efficiency is improved, and heat generation of the stepping motor 14 is suppressed. Also, when the command speed suddenly varies and the speed deviation exceeds the reference level, the current command i* becomes the maximum current command value i*max, so that in the case of high speed-response being required, it is possible to power up the torque output of the stepping motor 14. Furthermore, when the speed deviation exceeds the reference level, the current command i* becomes the maximum current command value i*max until the set time passes from the time when the speed deviation exceeds the reference level, so that it is possible to keep the current command i* at the maximum current command value i*max until the operation of the stepping motor 14 is stabilized. Also, when the load torque equivalent-current command value is zero, the current command i* becomes the minimum current command value i*min, the stepping motor 14 can be positively started. Furthermore, even if the load torque equivalent-current command value becomes larger, the current command i* does not exceed the maximum current command value i*max, so that problems such as inverter damage and motor overheat will not occur.

Figure 5:
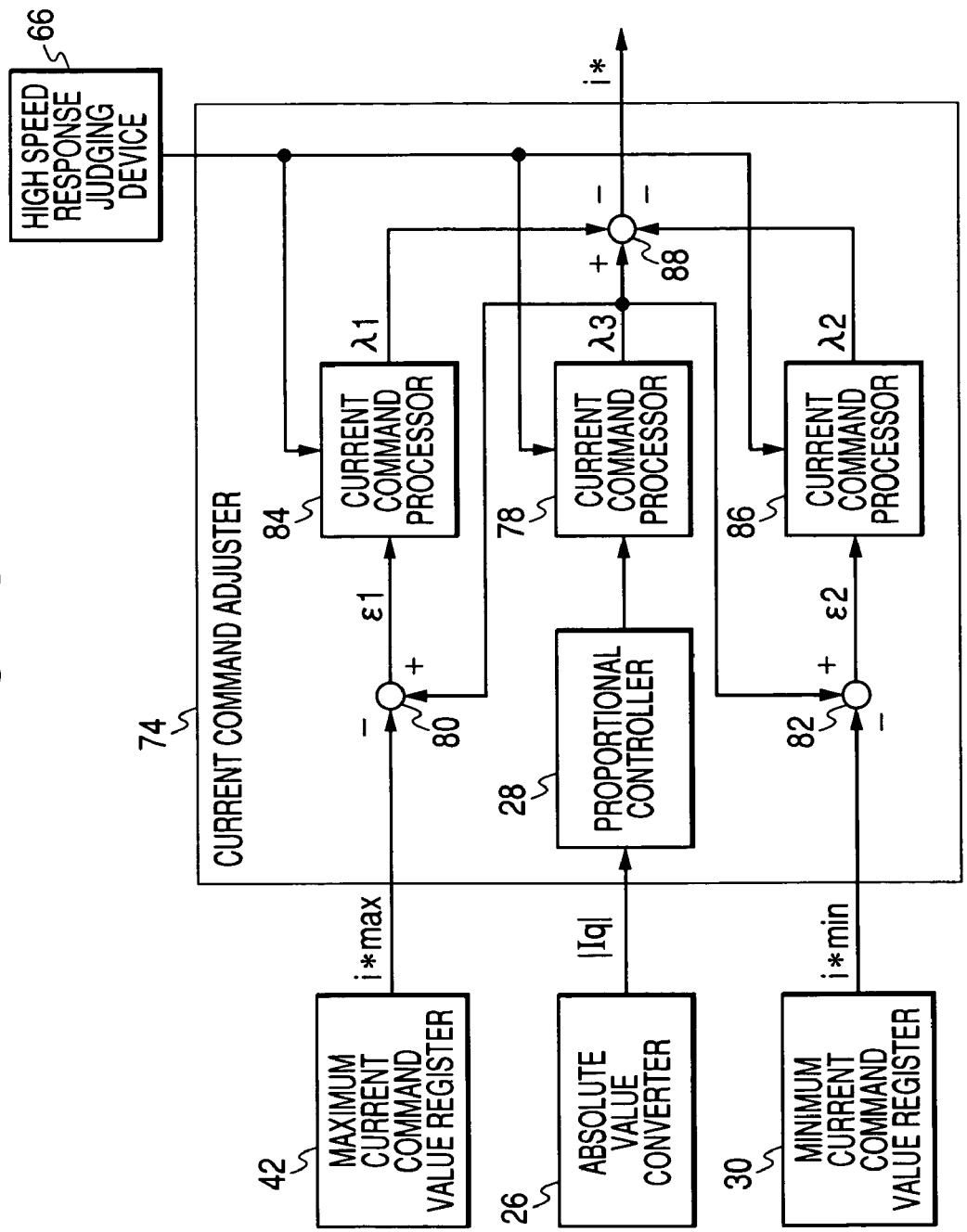
FIG. 5 is a block diagram illustrating a part of a stepping motor driver according to a second embodiment of the present invention.

Referring to FIG. 5, a stepping motor driver according to a second embodiment of the present invention will be discussed hereinafter. A current command processor 78 receives the load torque equivalent-current command value and a control signal from the high speed-response judging device 66, and outputs $\lambda 3$. Namely, when the first control signal is outputted from the high speed-response judging device 66, the current command processor 78 outputs the load torque equivalent-current command value as $\lambda 3$ and when the second control signal is outputted from the high speed-response judging device 66, the current command processor 78 outputs zero as $\pi 3$. An adder 80 obtains a difference value $\epsilon 1$ which is a difference between the output $\lambda 3$ and the maximum current command value i*max. An adder 82 obtains a difference value $\epsilon 2$ which is a difference between the output $\lambda 3$ and the minimum current command value i*min. A current command processor 84 receives the difference value $\epsilon 1$, and a control signal from the high speed-response judging device 66, and output $\lambda 1$. That is, when the first control signal is outputted from the high speed-response judging device 66 and the difference value $\epsilon 1$ is zero or less, the current command processor 84 outputs zero as $\lambda 1$, otherwise, its output $\lambda 1$ equals $\epsilon 1$. Also, when the second control signal is outputted from the high speed-response judging device 66, the current command processor 84 causes $\lambda 1$ to equal $\epsilon 1$ regardless of the difference value $\epsilon 1$. A current command processor 86 receives the difference value $\epsilon 2$, and a control signal from the high speed-response judging device 66, and outputs $\lambda 2$. That is, when the first control signal is outputted from the high speed-response judging device 66 and the difference value $\epsilon 2$ is zero or more, the current command processor 86 outputs zero as $\lambda 2$, otherwise, its output $\lambda 2$ equals $\epsilon 2$. Also, when the second control signal is outputted from the high speed-response judging device 66, the current command processor 86 causes $\lambda 2$ to be zero regardless of the difference value $\epsilon 2$. An adder 88 subtracts the outputs $\lambda 1$ and $\lambda 2$ from the output $\lambda 3$ and outputs the current command i*. Therefore, when the first control signal is outputted from the high speed-response judging device 66, the output $\lambda 3$ is the load torque equivalent-current command value. Therefore, when the load torque equivalent-current command value is not less than the minimum current command value i*min and not more than the maximum current command value i*max, the difference value $\epsilon 1$ is not more than zero and the difference value $\epsilon 2$ is not less than zero, so that the adder 88 outputs the load torque equivalent-current command value because the outputs of $\lambda 1$ and $\lambda 2$ are zero. When the load torque equivalent-current command value is less than the minimum current command value i*min, the output $\lambda 1$ is zero and the output $\lambda 2$ becomes a value which is obtained by subtracting the minimum current command value i*min from the load torque equivalent-current command value, so that the adder 88 outputs the minimum current command value i*min. When the load torque equivalent-current command value exceeds the maximum current command value i*max, the output $\lambda 1$ becomes a value which is obtained by subtracting the maximum current command value i*max from the load torque equivalent-current command value, and the output $\lambda 2$ is zero, so that the adder 88 outputs the maximum current command value i*max. Also, when the second control signal is outputted from the high speed-response judging device 66, the output $\lambda 3$ is zero regardless of the load torque equivalent-current command value, so that the difference value $\epsilon 1$ and the output $\lambda 1$ are negative maximum current command value i*max and the output $\lambda 2$ is zero. Therefore, the adder 88 outputs the maximum current command value i*max. The current command processors 78, 84, 86 and the like constitute a current command adjuster 74 which outputs an output of the adder 88. An output of the current command adjuster 74 is used as the current command i*.

The maximum current command register 42, the minimum current command value register 30, and the current command adjuster 74 constitute a current command outputting means adapted for outputting a current command according to an absolute value of a torque component current when a first control signal is outputted from a high speed-response judging means, and outputs a maximum current command value as the current command when a second control signal is outputted from the high speed-response judging means. The current command adjuster 74 constitutes a current command adjusting means which, when the first control signal is outputted from the high speed-response judging means, is adapted to output a load torque equivalent-current command value proportional to the absolute value of the torque component current if the load torque equivalent-current command value is not less than a minimum current command value and not more than a maximum current command value, is adapted to output a minimum current command value if the load torque equivalent-current command value is less than the minimum current command value, and is adapted to output the maximum current command value if the load torque equivalent-current command value exceeds the maximum current command value.

In this stepping motor driver, the proportional controller 28 obtains the load torque equivalent-current command value from the absolute value of the torque component current Iq. The current command processor 78 receives the load torque equivalent current command value, and the control signal from the high speed-response judging device 66, and outputs $\lambda 3$. The adder 80 obtains the difference value $\epsilon 1$ from the output $\lambda 3$ and the maximum current command value i*max. The adder 82 obtains the difference value E 2 from the output $\lambda 3$ and the minimum current command value i*min. The current command processors 84, 86 output $\lambda 1$, $\lambda 2$ depending upon the difference values $\epsilon 1$, $\epsilon 2$ and the control signal from the high speed-response judging device 66. The adder 88 outputs the current command i* depending upon the outputs $\lambda 1$–$\lambda 3$. Therefore, if the first control signal is outputted from the high speed-response judging device 66, if the load torque equivalent-current command value is not less than the minimum current command value i*min and not more than the maximum current command value, the current command adjuster 74 outputs the load torque equivalent-current command value as the current command i*. When the load torque equivalent-current command value is less than the minimum current command value i*min, the current command adjuster 74 outputs the minimum current command value i*min as the current command i*. When the load torque equivalent-current command exceeds the maximum current command value i*max, the current command adjuster 74 outputs the maximum current command value i*max as the current command i*. Also, when the second control signal is outputted from the high speed-response judging device 66, the current command adjuster 74 outputs the maximum current command value i*max as the current command i* while the set time passes from when the speed deviation exceeds the reference level.

In this stepping motor driver, when a change in the command speed is small and the speed deviation is not more than the reference level, if the load torque equivalent-current command value is not less than the minimum current command value i*min and not more than the maximum current command value i*max, the current command i* equals the load torque equivalent-current command value. Therefore, since the exciting current in the stepping motor 14 becomes larger as the absolute value of the load torque increases and, conversely, the exciting current in the stepping motor 14 becomes smaller as the absolute value of the load torque decreases, power consumption can be reduced and efficiency can be improved and heat generation of the stepping motor 14 can be suppressed. Also, when the command speed suddenly varies and the speed deviation exceeds the reference level, the current command i* equals the maximum current command value i*max, so that in the event that high speed-response is required, it is possible to power up the torque output of the stepping motor 14. Furthermore, when the speed deviation exceeds the reference level, the current command i* equals the maximum current command value i*max until the set time passes from the time when the speed deviation exceeds the reference level, so that the current command i* is maintained at the maximum current command value i*max until the operation of the stepping motor 14 is stabilized. Also, when the load torque equivalent-current command value is less than the minimum current command value i*min, the current command i* equals the minimum current command value i*min, so that the stepping motor 14 can positively start. Furthermore, when the load torque equivalent-current command value exceeds the maximum current command value i*max, the current command i* equals the maximum current command value i*max, so that such as inverter damage and motor overheat will not occur.

Incidentally, while the above description is made of the stepping motor that is a two-phase stepping motor, the invention may be applied to polyphase stepping motors.

The terms and expressions which have been employed herein are used as terms of description and not of limitation, and there is no intention in the use of such terms and expressions of excluding any equivalents of the features shown and described, or any portions thereof, but it is recognized that various modifications are possible within the scope of the invention claimed.

What is claimed is:

1. A stepping motor driver which supplies sinusoidally varying exciting currents to a stepping motor each time an external command pulse is applied, said stepping motor driver comprising:
    (a) an excitation angle generating means for generating an excitation angle from said external command pulse;
    (b) a current control means for controlling said exciting currents according to said excitation angle and a current command;
    (c) a current detection means for detecting phase currents of said stepping motor;
    (d) an angle detection means for detecting a rotor rotation angle of said stepping motor;
    (e) a torque component current calculating means for calculating a torque component current from said phase currents and said rotor rotation angle;
    (f) an absolute value converting means for obtaining an absolute value of said torque component current;
    (g) a high speed-response judging means adapted for outputting a first control signal when a speed deviation between a command speed and a rotor speed is not more than a reference level, and outputting a second control signal when said speed deviation exceeds said reference level; and
    (h) a current command outputting means adapted for outputting said current command according to said absolute value of said torque component current when said first control signal is outputted from said high speed-response judging means, and outputting a maximum current command value as said current command when said second control signal is outputted from said high speed-response judging means.

2. The stepping motor driver according to claim 1, wherein said current command outputting means comprises a changeover switch adapted to be switched according to said first and second control signals.

3. The stepping motor driver according to claim 2, wherein said current command outputting means comprises a proportional control means adapted for outputting a load torque equivalent-current command value proportional to said absolute value of said torque command current.

4. The stepping motor driver according to claim 3, wherein said current command outputting means comprises an adder means adapted for adding said load torque equivalent-current command value to a minimum current command value.

5. The stepping motor driver according to claim 4, wherein said current command outputting means comprises a limitation means adapted for outputting a maximum current command value when the sum of said minimum current command value and said load torque equivalent-current command value exceeds said maximum current command value.

6. The stepping motor driver according to claim 1, wherein said current command outputting means comprises a current command adjusting means which, when said first control signal is outputted from said high speed-response judging means, is adapted to output said load torque equivalent-current command value proportional to said absolute value of said torque component current if said load torque equivalent-current command value is not less than a minimum current command value and not more than a maximum current command value, is adapted to output said minimum current command value if said load torque equivalent-current command value is less than said minimum current command value, and is adapted to output said maximum current command value if said load torque equivalent-current command value exceeds said maximum current command value.

7. The stepping motor diver according to claim 1, wherein said high speed-response judging means comprises a time limiting means adapted to output said first control signal when a set time passes from the time when said second control signal is outputted.

8. The stepping motor driver according to claim 1, wherein said high speed-response judging means comprises a command speed detecting means adapted for detecting said command speed from a change in said excitation angle, and a rotor speed detecting means adapted for detecting said rotor speed from a change in said rotor rotation angle.

* * * * *